March 2, 1937.  M. B. SOLOMON  2,072,433
COCKTAIL SHAKER
Filed Oct. 19, 1935

INVENTOR.
MORRIS B. SOLOMON
BY C. P. Guepel
ATTORNEY.

Patented Mar. 2, 1937

2,072,433

UNITED STATES PATENT OFFICE 2,072,433

COCKTAIL SHAKER

Morris B. Solomon, New York, N. Y.

Application October 19, 1935, Serial No. 45,795

4 Claims. (Cl. 220—1)

This invention relates to cocktail shakers and has for its particular object to provide a cocktail shaker in which the mixture to be shaken is subjected to varied speed velocities during the mixing operation. For this purpose my invention consists of a cocktail shaker which has two substantially equal and preferably spherical cavities connected with a channel of a less diameter than the diameter of either of said cavities. In view of the arrangement of the parts the contents within the shaker is moved in such manner as to subject the contents to different speeds of movement while mixing is taking place and in consequence thereof a most thorough mixing is obtained.

For its purpose and object, my improved cocktail shaker consists of two substantially equal spherically shaped members one of which has an inlet opening for the supply of the mixture to be shaken along with any ice which is desired to be added and which opening at the same time acts as a filter to enable the contents to be discharged from the cocktail shaker when so desired. The two spherically shaped members are connected with a sleeve-like member the diameter of which is considerably less than the diameter of the spherical members. The interior contour of the spherical members and that of the connecting sleeve is such that the liquid mixture has an uninterrupted flow, from one spherical member to the other and return.

The invention will be further described hereinafter, embodiments thereof will be shown in the drawing, and finally set forth in the appended claims.

In the accompanying drawing:—

Similar numerals refer to similar parts throughout the several views.

Figure 1:
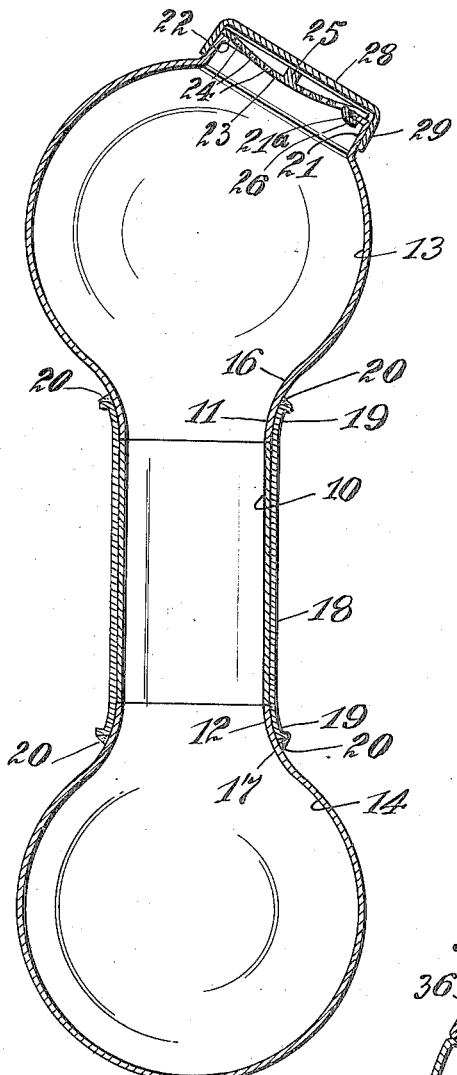
Figure 1 is a longitudinal central section of my improved cocktail shaker.

Referring to the drawing and more particularly to Figure 1, a central cylindrical portion 10 at each of its free ends, abuts against cylindrically shaped portions 11 and 12 of the two spherical members 13 and 14. This abutment of the parts just described creates an entirely free and uninterrupted flow of liquid through the interior of the sleeve 10 and into and out of each of the spherical members 13 and 14. These spherical members are of the same size both exteriorly and interiorly, and each of their diameters is larger than the diameter of the cylindrical portion 10. By reason thereof the flow of liquid into the cylindrical sleeve 10 is of different velocity than when the liquid enters either of the spherical members 13 or 14. This change of velocity of liquid is brought about due to the difference in the diameters of the chambers through which the liquid flows and as stated the flow of liquid is uninterrupted due to the cylindrical shape of the ends 11 and 12 of the spherical members 13 and 14, which cylindrical shaped portions merge into curved portions 16 and 17. Around the cylindrical member 10, and the cylindrically shaped ends 11 and 12, a sleeve 18 is placed, which has its ends 19 soldered to the exterior of the cylindrically shaped ends of the spherical members 13 and 14, by the solder 20.

Figure 2:
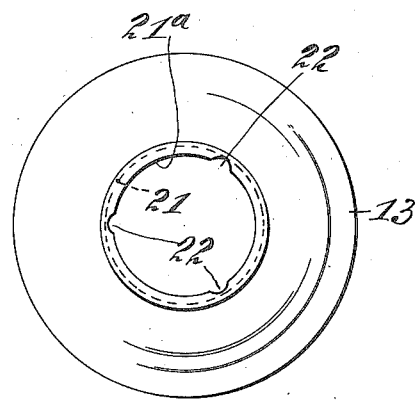
Figure 2 is a plan view of the inlet or the exit opening with the cover removed.
Figure 3:
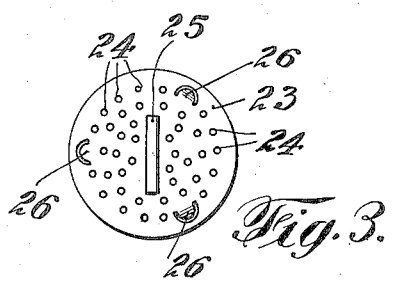
Figure 3 is a plan view of the filter or screen adapted for insertion into the opening shown in Figure 2.

One of the members shown in Fig. 1, the member 13, is provided with a cylindrical extension 21 which has a circumferential flange 21a having recesses or cut-outs 22, preferably three in number, as shown in Fig. 2. The filter plate consisting of a disk 23, a plurality of openings 24, a small handle 25 and struck up portions 26, three in number, are shown in Fig. 3. The filter plate 23 is moved through the opening of the flange 21a and then inserted therein, registration of the upset portions 26 with the recesses 22 permitting such insertion. The filter plate is then rotated whereby the upset parts 26 engage upon the flange 21a and the filter plate is held in position. A cap 28 having a cylindrical flange 29 with an interior diameter substantially equal to the exterior diameter of the cylindrical member 21, serves to close entirely the discharge opening so that the shaking operation can be carried out.

Figure 4:
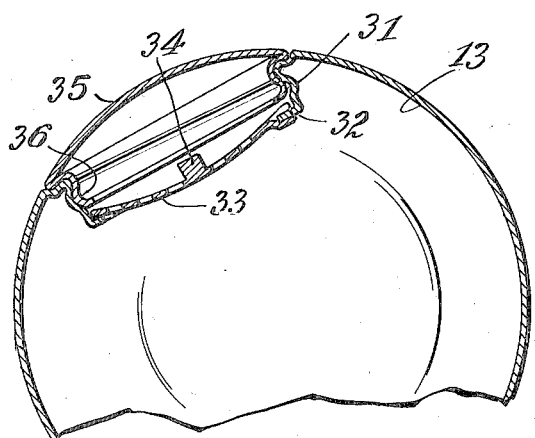
Figure 4 is a sectional view of another form of the discharge opening.

The discharge opening just described, can be embodied in either form as shown in Fig. 4. Here the cylindrical member 13 has an inwardly extending cylindrical portion 31 having a flange 32 provided with recesses similar to those shown in Fig. 2 and indicated by 22. A filter plate with openings is indicated by 33 and the handle thereof by 34. The discharge opening is closed by means of a cap 35 which has an inwardly extending flange portion 36 of screw-like shape which is adapted to engage the inwardly extending portion 31. The discharge opening is closed by screwing the cap 35 thereon and upon unscrewing the cap is opened.

The operation of the device is to have the filter plate and cap both open so that the discharge opening is entirely free for the pouring of the contents to be mixed through the opening, after which the filter plate is inserted followed by application of the cap, when the shaker is ready for use. When the contents has been sufficiently shaken and mixed it may be poured out of the discharge opening upon the removal of the exterior cap 28 as will be seen in the embodiment shown in Fig. 1, or by the removal of cap 35, as shown in the embodiment in Fig. 4.

Figure 5:
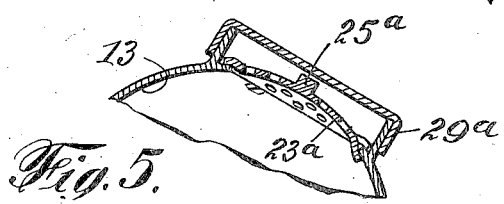
Figure 5 is another sectional view of the discharge opening.

In Fig. 5, a still further embodiment is shown in which the parts thereof are substantially like those depicted in Figs. 1 and 4 excepting that the filter plate forms a curved surface continuous with the interior curved surface of the spherical member 13.

Having thus described several embodiments of my invention it will be obvious that various changes and modifications may be made in the details of construction and design of those above specifically described without departing from the spirit thereof, such changes and modifications being restricted only by the scope of the following claims.

I claim:—

1. A cocktail shaker comprising a plurality of spherically shaped members of substantially equal interior capacity and having substantially cylindrical extensions, a connecting member of substantially cylindrical shape having its open ends merging into the extensions of said spherical members, a discharge opening in one of said spherical members, a closure for said discharge opening, said ends of the cylindrical member and ends of the spherical members being flush with each other and forming an uninterrupted flow surface for contents to be shaken therein, an exterior sleeve surrounding said cylindrical member and the exterior portions of the ends of the spherical members, and said discharge opening being provided with a filter adapted to be held within said closure and removed therefrom.

2. A cocktail shaker, comprising a pair of spherically-shaped members each having a reduced diameter extension at one side of substantially cylindrical form and emerging in continuous and uninterrupted curved walls from its respective member, a substantially cylindrical connecting member disposed in endwise abutting relation against said extensions to provide continuous and uninterrupted walls between the spherically-shaped members and through the connecting member, and a sleeve surrounding the connecting member and extending in overlapping relation upon said extensions to hold the spherically-shaped members on the opposite ends of the connecting member.

3. A cocktail shaker comprising a plurality of spherically shaped members of substantially equal interior capacity and having substantially cylindrical extensions, a connecting member of substantially cylindrical shape having its open ends merging into the extensions of said spherical members, means for securing said extensions to said connecting member, a discharge opening in one of said spherical members, a closure for said discharge opening, said ends of the cylindrical and ends of the spherical members being flush with each other and forming an uninterrupted flow surface for contents to be shaken therein, and a filter secured across said discharge opening.

4. A cocktail shaker comprising a pair of spherically shaped members each having a reduced diameter extension at one side of substantially cylindrical form and merging in continuous and uninterrupted curved walls from its respective member, a substantially cylindrical connecting member disposed in endwise abutting relation against said extensions to provide continuous and uninterrupted walls between the spherically shaped members and through the connecting member, means for securing said extensions to said connecting member, and a discharge means carried by one of said spherically shaped members.

MORRIS B. SOLOMON.